United States Patent [19]
Stoneham et al.

[11] 3,742,832
[45] July 3, 1973

[54] APPARATUS FOR RECEIVING A BATTERY HOLDER
[75] Inventors: Jeffrey R. Stoneham, Rochester; Benjamin B. Adams, III, Hilton, both of N.Y.
[73] Assignee: Eastman Kodak Company, Rochester, N.Y.
[22] Filed: Feb. 16, 1972
[21] Appl. No.: 226,924

Related U.S. Application Data
[62] Division of Ser. No. 76,836, Sept. 30, 1970.

[52] U.S. Cl. ............... 95/11 R, 95/31 EL, 95/53 E, 136/173, 206/1 R
[51] Int. Cl. ......................................... G03b 19/00
[58] Field of Search ............. 95/11 R, 31 EL, 53 E; 240/10.65; 136/173; 206/1 R

[56] References Cited
UNITED STATES PATENTS
3,660,169  5/1972  Clune................ 136/173 X
3,537,909  11/1970  Horton............... 95/31 EL
3,439,596  4/1969  Peterson et al. .......... 95/11 R
3,650,378  3/1972  Kakiuchi et al................. 206/1 R
3,655,452  4/1972  Cich............................. 136/173 X
3,587,425  6/1971  Biber........................... 95/31 EL FOREIGN PATENTS OR APPLICATIONS
1,232,013  1/1967  Germany.................. 95/31 EL
1,300,006  7/1969  Germany.................. 95/31 EL Primary Examiner—Richard L. Moses
Attorney—W. H. J. Kline et al.

[57] ABSTRACT

A camera having a cavity for receiving a battery holder of the type having an elongated dimension, an end wall generally normal to the elongated dimension of the holder, and a slot in the end wall. The camera cavity has an elongated shape longer than the elongated dimension of the battery holder and an opening at one end through which a battery holder may be inserted and removed. A rib on the camera adjacent the opening enters the groove of a received battery holder and a spring in the other end of the cavity resiliently urges the battery holder toward the rib to secure the holder in the cavity.

3 Claims, 3 Drawing Figures

PATENTED JUL 3 1973    3,742,832

3,742,832

APPARATUS FOR RECEIVING A BATTERY HOLDER

CROSS-REFERENCE TO RELATED APPLICATION

This is a divisional of application, Ser. No. 76,836, now Def. Pub. T896007 filed Sept. 30, 1970.

BACKGROUND OF THE INVENTION

1. Field of the Invention

This invention relates to apparatus for receiving electrical battery holders.

2. Description of the Prior Art

The refinement of miniaturized electrical batteries and the desirability of reducing the size of cameras has led to the wide use of compact disc-like batteries in cameras. Such batteries frequently have a flattened cylindrical configuration with coaxial sections of varying diameters, this configuration being designated herein as "disc-like." Such batteries are disclosed in U.S. Pat. Nos. 2,481,539; 2,542,575 and 2,712,565 and are well known in the art.

Battery holders forming a part of a camera housing for receiving and holding a plurality of such batteries so that the batteries are either axially aligned or are positioned alongside one another, are also well known in the art. Examples of the foregoing type of battery holders are described in French patent 1,237,515, and are additionally incorporated in many popular cameras.

Battery holders forming a part of a camera housing are additionally known which support two disc-like batteries in a slightly staggered relationship. When used with two batteries, this arrangement adds bulk to the holding portion of the camera but has the advantage of assuring the proper orientation of the batteries in the holder with regard to their polarity. A battery holder of the latter type is taught by commonly assigned, copending U.S. Patent application Ser. No. 697,218, now U.S. Pat. No. 3,537,909 which was filed on Jan. 11, 1968 in the name of William H. Horton.

Battery holders of all of the forgoing types are usually well suited for use in cameras except that they often have dimensions which are difficult to fit in the camera, thus adding bulk thereto and forcing styling changes upon a designer.

The battery industry now has produced a new smaller disc shaped battery advantageous for use in a camera when in a series of three or more. However, three batteries arranged in a side by side relationship require holders having a length of at least three times the battery diameter, while a like number of batteries arranged coaxially must have a dimension at least three times the thickness of a battery. Thus, the incorporation of three or more batteries in a camera which has been designed to have a small size, could require an increase in the size of the camera. For instance, where a camera structure defines sufficient space for the accommodation of a set of three or more batteries if they can be arranged to have a maximum dimension of less than the sum of the battery diameters, and a minimum dimension of less than one battery diameter, the failure to fit the batteries in that space has the effect of requiring the addition of undesired bulk to the camera.

Batteries used in cameras occasionally leak, thereby causing corrosion of camera components. Provision has heretofore not been made for avoiding this serious problem in cameras using batteries. The use in some cameras of removable clips for receiving disc-like batteries and holding them in the camera does not affect this situation because the batteries are not protected by the clip, and they remain susceptible to damage and corrosion-causing leakage.

SUMMARY OF THE INVENTION

An object of the present invention is to provide means for receiving a battery holder for ease in insertion and removal of the holder and for insuring that a received battery holder is properly oriented.

According to a preferred embodiment, apparatus is provided for receiving a battery holder which is a self-contained package comprising a plurality of the batteries potted in molded plastic, the holder having externally accessible electrical contacts by means of which an electrical load can be put on the batteries. The apparatus includes wall means defining a cavity and an opening through which such a holder may be inserted into the cavity. A rib cooperates with a groove in the holder to support a received holder, and a spring urges the holder toward the rib. The cavity is formed to prevent improper orientation of the battery holder.

The invention, and its objects and advantages, will become more apparent in the detailed description of the preferred embodiments presented below.

BRIEF DESCRIPTION OF THE DRAWINGS

In the preferred embodiment of the invention described below, reference is made to the accompanying drawings, in which.

DESCRIPTION OF A PREFERRED EMBODIMENT OF THE INVENTION

Figure 1:
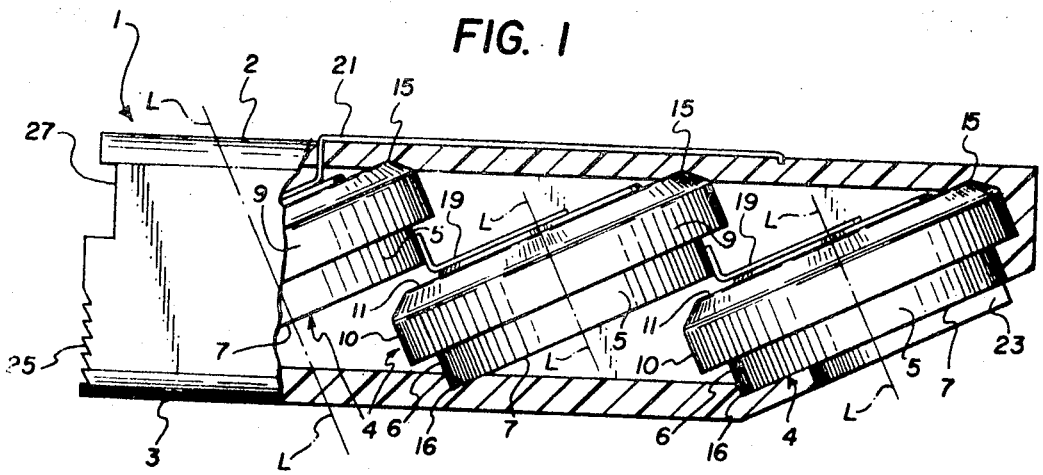
FIG. 1 is an enlarged side view of a battery holder for use with the apparatus of the present invention shown with a portion cut away to reveal the internal structure thereof.

FIG. 1 illustrates a battery holder according to our copending U.S. Pat. application Ser. No. 76,836. The holder supports the batteries in a shingled manner such that the longest dimension of the holder is less than the sum of the diameters of the respective batteries, and the height or thickness of the holder is less than both the sum of the thicknesses of the batteries and the diameter of any one battery. The battery holder is thus characterized by a low height, a short length, and a small bulk. The holder substantially encloses the batteries to protect them against deterioration and abuse, while protecting the camera against damage from battery leakage. The batteries are electrically connected in series, and the exposed end of one battery serves as a positive terminal for the battery pack, while an external terminal is electrically connected to the end of another battery to serve as the negative terminal.

Referring specifically to the drawings, FIG. 1 shows a battery holder 1 which has a somewhat elongated configuration with an exposed battery at one end and a grooved, serrated end at the other. The compactness and simplicity of the holder are apparent from FIG. 1. For reference purposes, the respective walls of holder 1 are termed a top wall 2 and a bottom wall 3, these walls being slightly curved but generally flat.

A plurality of batteries 4 are supported by the inwardly facing portions of upper wall 2 and lower wall 3 of holder 1. Although holder 1 is shown containing three batteries, the holder could be designed to hold any plurality of batteries. Each battery has a disc-like configuration, and includes a cylindrical lower portion 5 defined by a side wall 6 and a bottom end wall 7, and a cap 9 defined by a side wall 10 and a top end wall 11. Cap 9 is coaxial with the base and has a diameter somewhat larger than that of lower portion 5.

In order to minimize the bulk of the holder for the batteries, they are supported in a shingled manner as shown. Thus, the respective axes L—L of the batteries are mutually parallel, the batteries are offset or staggered relative to each other, and they are tilted relative to top wall 2 and lower wall 3 of holder 1. Corresponding points on batteries 3, such as their uppermost points 15 and lowermost points 16 thus define lines parallel to walls 2 and 3.

In order to obtain the shingled effect, the batteries are engaged on their respective side and end walls to locate them as desired. Hence, the inwardly facing portion of lower wall 3 engages battery walls 6 and 7, and the inwardly facing portion of upper wall 2 engages battery walls 10 and 11. Other means of supporting the batteries will occur to those skilled in the art. For example, appropriate posts can extend inwardly from the interior walls of the holder both to insulate the batteries from each other and to hold them in place. In the embodiment shown, the batteries are simply spaced from each other to attain the insulation effect.

The batteries are electrically connected together by means of contacts 19 which are welded to the positive and negative poles of adjacent batteries. The contacts can be advantageously prewelded to the batteries prior to their assembly in the holder. An electrically conductive strip 21 is welded to cap 9 of one end battery, and extends to the exterior of holder 1 to serve as a negative external contact. The holder has an aperture 23 defined adjacent the lower portion of the other end battery for exposing a part of the lower end wall thereof, the latter serving as the positive external contact. An electrical circuit can now be completed by connecting an electrical load across the two external contacts. An alternative external negative contact could comprise an electrically conductive strip welded to the negative pole of the last-mentioned battery and extending through a wall of the battery holder. Holder 1 is provided with serrations 25 for ease in insertion and removal from a camera according to the present invention. Holder 1 is additionally provided with a groove 27, by means of which the holder is retained in the camera receptacle as will be explained hereinafter, and a section 29 is tapered adjacent aperture 23 to assure the proper orientation of holder 1 prior to installation in the camera.

Figure 2:
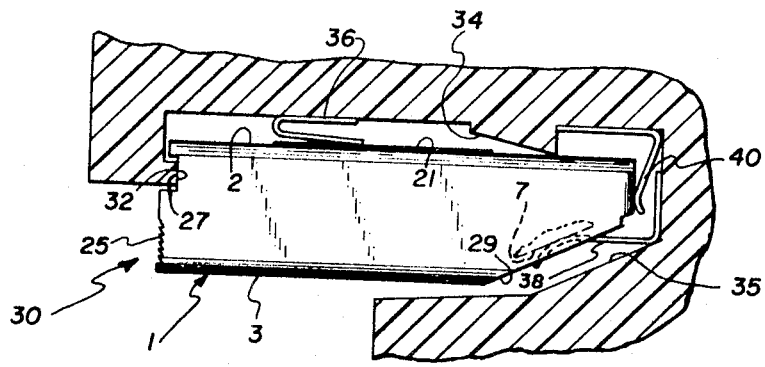
FIG. 2 is an enlarged partial cross-sectional top view of the apparatus according to the present invention having a battery holder installed therein.

In accordance with the present invention, a receptacle for battery holder 1 is shown in FIG. 2 and comprises a plurality of walls defining a cavity having an entrance aperture 30, a rib 32 extending into the cavity adjacent aperture 30, and a locating lug 34. The cavity is tapered opposite aperture 30 by a wall 35. An electrical contact 36 in the form of leaf spring is connected to an electrical lead, not shown, and another contact 38 is connected to another lead, not shown. The leads of contacts 36 and 38 are connected to an electrical load in the apparatus such as an exposure control device of a camera or the like. A leaf spring 40 is mounted in the base of the cavity.

It can be readily seen that installation of the battery into the camera cavity is a simple matter, and that proper orientation of the battery is insured. With the battery oriented as shown in FIG. 2, the tapered end is inserted into entrance aperture 30 of the camera cavity. By placing a finger or a thumb on serrations 25, holder 1 can be pushed into the cavity against leaf spring 40. Once in the cavity, holder 1 is moved laterally (upwardly as viewed in FIG. 2) until groove 27 aligns with rib 32. When the holder is now released, spring 40 will move holder 1 rearwardly so that rib 32 enters groove 27 to lock the holder in place. Electrical contacts 36 and 38 now engage negative contact 21 and position contact 7, respectively.

To remove holder 1, the foregoing operation is reversed. That is, the holder is moved against spring 40 until rib 32 is clear of slot 27. The holder is then moved downwardly as viewed in FIG. 2, and spring 40 moves the holder sufficiently out of the cavity for the operator to grasp the holder.

Figure 3:
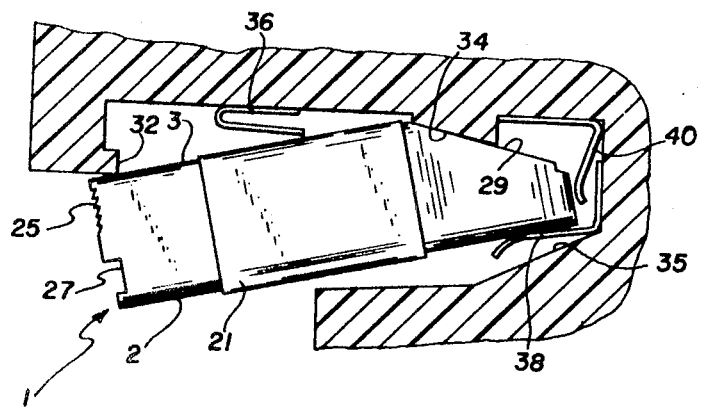
FIG. 3 is a view similar to FIG. 2 showing an improperly inserted battery holder.

The cavity has been provided with a shape which prevents improper insertion of the holder. Referring to FIG. 3, we have shown a holder being attempted to be incorrectly inserted in the camera. It can readily be seen that wall 35 interferes with the battery holder to prevent such orientation.

The invention has been described in detail with particular reference to preferred embodiments thereof, but it will be understood that variations and modifications can be effected within the spirit and scope of the invention.

I claim:

1. Apparatus for use with a battery holder having an elongated dimension, an end wall generally normal to the elongated dimension, and a slot defined in the end wall; said apparatus comprising:
   a. wall means defining
      1. a cavity of overall dimension sufficient to receive such battery holders, said cavity having first and second ends spaced apart a distance greater than the elongated dimension of the battery holders, and
      2. an opening proximate said first end of said cavity of size and location such that such battery holders may be inserted in said cavity in an orientation with the elongated dimension of an inserted battery holder extending generally along the space between said first and second ends of said cavity;
   b. spring means in said cavity for contacting an inserted battery holder and for urging such inserted battery holder away from said second end of said cavity;
   c. a projection on said wall means adjacent said opening, said projection extending into said cavity toward said second end of said cavity a distance slightly less than the difference between the elongated dimension of the battery holder and said distance between said first and second ends of said cavity, said projection being constructed and located to enter into the slot of a battery holder which has been received in said cavity and is urged toward said first end of said cavity by said spring means.

2. Apparatus as defined in claim 1 wherein said projection is an elongated rib extending across said first end of said cavity.

3. Apparatus as defined in claim 1 wherein said projection defines a surface facing away from said opening.

* * * * *